Figure 1:
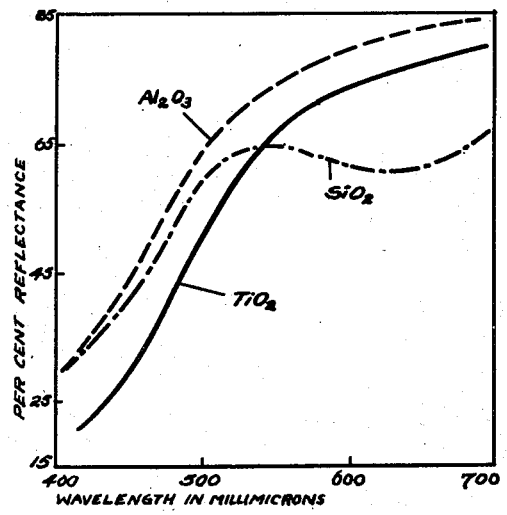

Dec. 30, 1952  B. W. KING, JR., ET AL  2,623,833
CERAMIC PIGMENT

Filed June 30, 1949  2 SHEETS—SHEET 1

INVENTORS.
B. W. King Jr.
BY A. O. Tesar
William H Brown
Atty.

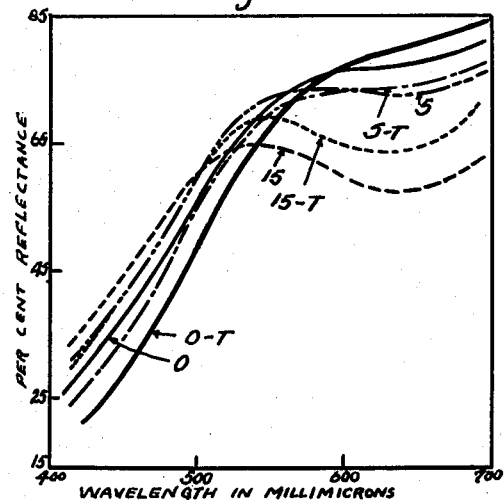
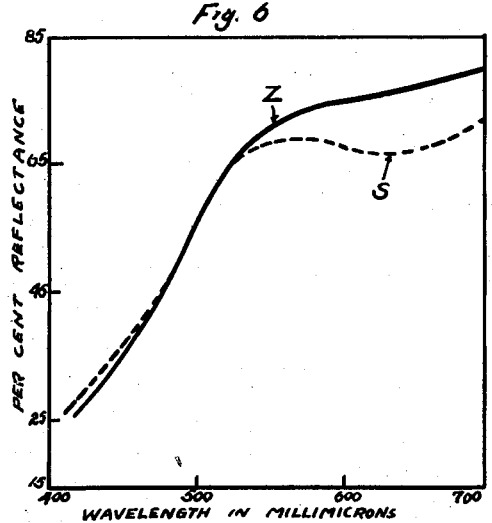
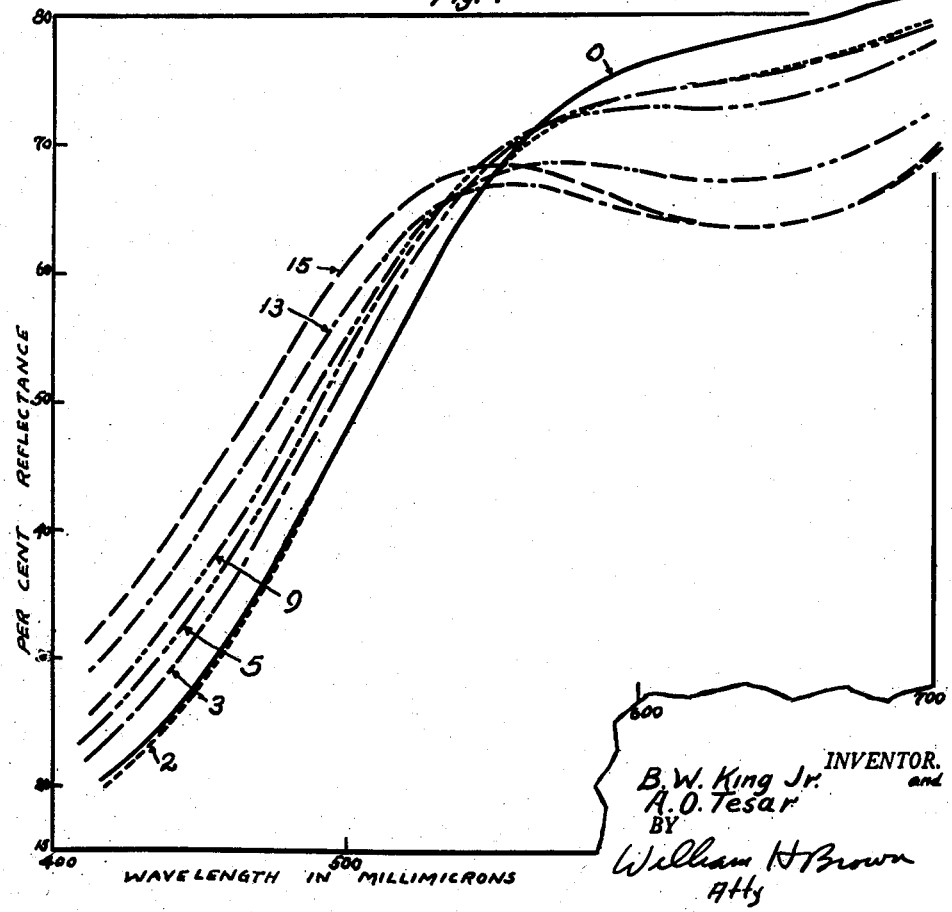

Patented Dec. 30, 1952

2,623,833

UNITED STATES PATENT OFFICE 2,623,833

CERAMIC PIGMENT

Burnham W. King, Jr., Shaker Heights, and Adolph O. Tesar, Cleveland, Ohio, assignors to The Harshaw Chemical Company, Cleveland, Ohio, a corporation of Ohio Application June 30, 1949, Serial No. 102,198

4 Claims. (Cl. 106—299)

This invention relates to ceramic pigments principally composed of $ZrO_2$, $V_2O_5$ and $TiO_2$ which (as pigment powders) are of a distinctly brown color but which when fired in glazes or bodies result in strongly colored ceramic ware only slightly browner than lemon yellow.

We are aware that prior to our invention, it has been proposed to produce yellow ceramic pigments by heating together $ZrO_2$ and a vanadium oxy-compound. British Patent Number 379,572 (September 1, 1932) suggests calcining $ZrO_2$ or $SnO_2$ with a small quantity of vanadium or molybdenum oxide at from 1100° C. to 1500° C. for the production of yellow pigments. This same patent suggests also the three component compositions resulting from the addition of small quantities of $SiO_2$, $TiO_2$, or $Al_2O_3$ to the $ZrO_2$, vanadium oxide mixture. Earl (U. S. Patent 2,438,335) has claimed good results from $ZrO_2$ and $V_2O_5$ when pure $ZrO_2$ is used. He requires freedom from soda. The British patent is silent as to the degree of purity. The British patentee prefers to have silica or alumina present (in the order of 1%) while Earl does not use either. Seabright (U. S. Patent No. 2,441,447) uses $ZrO_2$, $SiO_2$ and $V_2O_5$, ammonium metavanadate or the like and obtains greens in the absence of alkali and blues when alkali is present. Seabright, however, works within proportion limits quite different from those mentioned in the British patent.

It might be inferred from the literature that the color exhibited by such pigments depends upon the valency state of the vanadium but we are not certain as to this. The blue color obtained by Seabright might be explained as a result of conditions rendering vanadium stable in the tetravalent form and the yellows of the British patent (which our experiments indicate are poor pigments) might be explained as a result of conditions rendering vanadium stable in the pentavalent form. The green obtained by Seabright could then be explained as a stable mixture of tetravalent and pentavalent vanadium. Such theories may or may not be eventually demonstrable but it is our experience that many compositions of the general types described in the above patents are of no value as ceramic pigments. If it can be assumed from his failure to mention it that the British patentee did not realize the excellence of color obtainable by the use of pure $ZrO_2$, he was very close to the pigment of the Earl patent but failed to achieve the same quality. This may indicate how critical the production of an excellent pigment of this type can be.

We have experimented with yellow pigments of the type referred to in the British patent, especially those containing zirconium, vanadium and silicon and wherein $ZrO_2$ is the principal component. Like Earl, we found that a good pigment was not obtained by simply calcining technical $ZrO_2$ and $V_2O_5$ or ammonium metavanadate when the $ZrO_2$ was contaminated with soda. We did not, however, favor the use of pure $ZrO_2$ on account of its cost and sought to find other means of solving the problem. We have done considerable work with a commercial type of $ZrO_2$ (Opax) containing soda and silica. The soda is typically about 1% by weight as $Na_2O$ and the silica runs about 5% by weight, percentages based upon the total weight of the $ZrO_2$ plus impurities on the analytical basis, but is mostly if not entirely present as a zirconium silicate. We did not secure a pigment capable of yielding a strong yellow by calcining this impure $ZrO_2$ with $V_2O_5$ or ammonium metavanadate.

We have discovered, however, that if we calcine $ZrO_2$ containing from 0.2 to 2% of $Na_2O$ by weight and less than 5% of free silica, preferably less than 2%, by weight, with $V_2O_5$ or ammonium vanadate and $TiO_2$, in suitable proportions and under suitable conditions, we do obtain a pigment capable of yielding excellent, strong yellow ceramic bodies or glazes (slightly browner than lemon yellow) in spite of the presence of such proportions of soda. The pigments themselves in powder form do not have the desired yellow color but are quite brown. In respect to free silica content, it should be noted that $ZrO_2$ is usually derived from zirconium silicate and the silica content frequently is not free silica even though it might be inferred from the report of the analyst to be such. The manufacturer may give only the analytical report and so lead to the assumption that the silica content is free silica when in fact it is present as zirconium silicate or in some other tightly bound state of association rendering it unreactive. We have found, furthermore, that even in the absence of soda in the $ZrO_2$, brighter colors are obtained by the use of $ZrO_2$, $V_2O_5$ and $TiO_2$ in the proportions indicated below. The titania used may be in either the rutile or the anatase form. Thus, whether the $ZrO_2$ be pure or contain soda as an impurity, there is a definite improvement in the use of $TiO_2$ in proper proportions although the improvement is not as great in soda free combinations as in soda containing combinations. On a general basis, suitable proportions for essential components for realizing the benefit of $TiO_2$ would be: $ZrO_2$ 60 to 90 parts by weight, $V_2O_5$ 4 to 30 parts by weight and $TiO_2$ 2.5 to 35 parts by weight. These proportions would be for the pigment and would also be the same for the preferred batch except that 4 to 30 parts $V_2O_5$ would be changed to 5.1 to 38.5 $NH_4VO_3$, although $V_2O_5$ can be used in the batch and other materials which upon calcination will yield the essential oxides are equivalent.

Using Opax, an impure $ZrO_2$ containing 1.0% of $Na_2O$ by weight and 5.0 per cent of unreactive SiO$_2$, suitable proportions are 60 to 90 parts by weight of such technical ZrO$_2$, 4 to 30 parts by weight V$_2$O$_5$ (equals 5.1 to 38.5 parts by weight of ammonium metavanadate) and 2.5 to 35 parts by weight TiO$_2$. Within these limits, optimum proportions are 75 to 86 parts by weight of such technical ZrO$_2$, 7 to 24 parts by weight of V$_2$O$_5$ (equals 9 to 34 parts by weight ammonium metavanadate) and 6 to 20 parts by weight of TiO$_2$. This may be expressed in more completely descriptive fashion as 50.4 to 75.6 ZrO$_2$, 4 to 30 V$_2$O$_5$, 2.5 to 35 TiO$_2$, 0.6 to 0.9 Na$_2$O and 9 to 13.5 ZrSiO$_4$, parts by weight respectively with optimum limits of Na$_2$O 0.7 to 0.86, ZrSiO$_4$ 11.2 to 12.9, ZrO$_2$ 63 to 72, V$_2$O$_5$ 7 to 24 and TiO$_2$ 6 to 20, parts by weight. We are not, however, restricted to the one type of technical ZrO$_2$ but may use others having varying amounts of Na$_2$O and SiO$_2$. Technical materials are available having from a trace to 5% Na$_2$O. Formulations exceeding 2% Na$_2$O (based upon the weight of the pigment) are unsuitable for our purpose. Silica (unreactive) may vary from none to 5% or 7% of the final pigment by weight. It is difficult to find a source of ZrO$_2$ having less than about 1% SiO$_2$. Free SiO$_2$ in the batch should not run more than 2% of the weight of the final pigment. The use of these technical materials is not necessary to the results. The technical ZrO$_2$ containing soda and unreactive SiO$_2$ can be replaced by highly pure ZrO$_2$ plus soda ash plus ZrSiO$_4$ in such proportions as to give the same calculated pigment compositions as the above stated proportion limits would require and when this is done, results are obtained which approximate those obtained with the technical materials. The results are vastly different when the technical materials are synthesized using free silica. The unreactive type of silica seems, therefore, to be merely the silica component of ZrSiO$_4$ present in the technical materials.

The batch, then, may contain ZrO$_2$, Na$_2$O, ZrSiO$_4$, SiO$_2$ (free), V$_2$O$_5$ or NH$_4$VO$_3$, and TiO$_2$ or materials which will yield these compounds upon firing; and they may be present in such proportions that the composition of the final pigment will be approximately (parts by weight):

| | | |
|---|---|---|
| ZrO$_2$ | 99.8 to 77 | |
| ZrSiO$_4$ | 0 to 21 | |
| Na$_2$O | 0.2 to 2.0 | 60 to 90 |
| SoO$_2$ (free) | 0 to 5.0 | |
| V$_2$O$_5$ | 4 to 30 | |
| TiO$_2$ | 2.5 to 35 | |

Preferable proportions for optimum results, considering costs as well as results in respect to the important impurities Na$_2$O, SiO$_2$ and ZrSiO$_4$, are approximately (parts by weight):

| | | |
|---|---|---|
| ZrO$_2$ | 90 to 85 | |
| ZrSiO$_4$ | 10 to 15 | 75 to 86 |
| Na$_2$O | 0.2 to 1.5 | |
| SiO$_2$ (free) | 0 to 2.0 | |
| V$_2$O$_5$ | 7 to 24 | |
| TiO$_2$ | 6 to 20 | |

Without distinguishing the source of oxides from the batch, the final pigment may essentially contain (parts by weight):

| | | |
|---|---|---|
| ZrO$_2$ | 99.8 to 98 | 60 to 90 |
| Na$_2$O | 0.2 to 2.0 | |
| V$_2$O$_5$ | 4 to 30 | |
| TiO$_2$ | 2.5 to 35 | |

This formulation omits zirconium silicate which is not a necessary component although usually present because of its presence as an impurity in the raw material. A preferable pigment composition, having regard to costs and best limits of proportions would be (parts by weight):

| | | |
|---|---|---|
| ZrO$_2$ | 96.8 to 93.5 | |
| SiO$_2$ | 2.5 to 5 | 75 to 86 |
| Na$_2$O | 0.2 to 1.5 | |
| V$_2$O$_5$ | | 7 to 24 |
| TiO$_2$ | | 6 to 20 |

Figure 2:
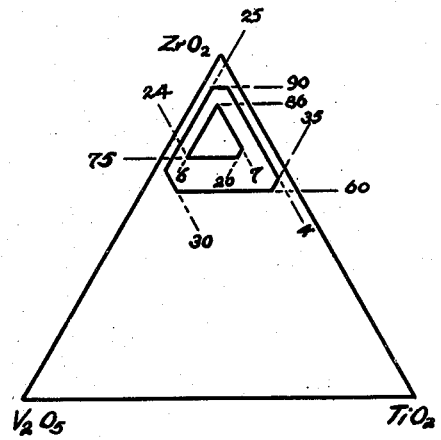
Figure 3:
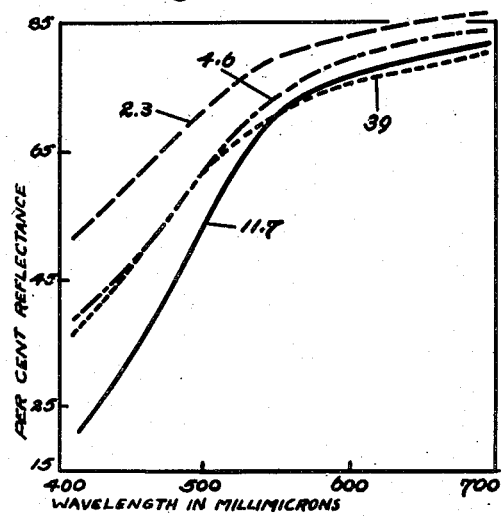

In the accompanying drawings, Fig. 1 is an approximate reproduction on a reduced scale of three spectrophotometer recordings on glazed tile showing the comparative effects of the use of SiO$_2$, Al$_2$O$_3$ and TiO$_2$ in a ZrO$_2$-V$_2$O$_5$ composition used for coloring the glaze on the tile; Fig. 2 is a triangular diagram showing suitable and optimum proportions of a technical ZrO$_2$, V$_2$O$_5$ and TiO$_2$ in the product (the ZrO$_2$ including Na$_2$O and SiO$_2$ in the above indicated proportions); Fig. 3 is a view similar to Fig. 1 but showing the effect on a ZrO$_2$-V$_2$O$_5$-TiO$_2$ composition (full line) of varying the proportion of V$_2$O$_5$; Fig. 5 is a view similar to Fig. 3 showing the effect on such composition of varying the proportion of TiO$_2$; Fig. 5 is a similar view comparing the color characteristics in tile of the optimum composition (0–T) with a similar composition omitting TiO$_2$ (0), compositions having 5% of free silica with (5–T) and without (5) TiO$_2$ and compositions having 15% of free silica with (15–T) and without (15) TiO$_2$; Fig. 6, a similar view comparing two synthetic approximations of the best composition (Fig. 1, TiO$_2$), the silica in S being free as introduced into the batch and in Z being combined in ZrSiO$_2$; and Fig. 7 is a similar view showing the effect of adding to the best composition (0, Fig. 7) varying quantities of free SiO$_2$.

In the production of pigments according to the invention, the batch is made up from suitable compositions which will break down into the above indicated oxides, or oxidize to the valence indicated, or the batch may be made up of the ultimate oxides themselves. A preferable source of vanadium pentoxide is ammonium metavanadate (NH$_4$VO$_3$). Zirconium oxide is preferably added as such to the batch, but as indicated above, it may contain small proportions of soda and zirconium silicate as impurities and may even contain a small proportion of free silica. TiO$_2$ is preferably introduced into the batch as such.

The components of the batch, in finely divided or powdered form are thoroughly admixed and calcined at a temperature of the order of from 1100° C. to 1400° C. The kiln atmosphere may be neutral or oxidizing but should not be reducing. The batch is placed in the kiln and brought up to the indicated temperature range and held therein for the desired period of time which may be from 1 hour to 8 hours or more, for example over night (about 15 hours) or even 24 hours, but there appears not to be any advantage in calcining for longer periods of time. Examples in the table below were calcined between 1100° C. and 1250° C. for about 6 hours, the temperature rising from 1100° C. to 1250° C. and falling again to 1100° C. in about that time. 1 to 8 hours may be considered a practical time range, the heating time being varied in proportion to the size of the batch and the temperature.

The above indicated proportion ranges have been indicated graphically in Fig. 2, the outer six-sided figure within the large triangle indicating suitable proportions which are those numerically stated above, and the small four-sided figure within the hexagonal figure indicating optimum proportions numerically stated above. The limiting chemical values have been placed on the drawing for convenience in view of the fact that the figure has been made on a small scale and, therefore, does not lend itself well to placing a series of cross lines to indicate the numerical values corresponding to the sides of the figures representing the proportion areas. It will be understood that distances from each side of the triangle toward the opposite angle indicate the proportion of the component indicated at the angle corresponding to any given point in the figure. This accords with conventional use of the triangular diagram.

The curved lines in Fig. 1 illustrate the effect of using titania, silica and alumina in a composition which otherwise is constant. For example, the full curved line marked $TiO_2$ indicates the color of a tile coated with a glaze colored by a strong pigment in accordance with the invention, the composition being that of sample 1 in the table below, and the other two curved lines indicate the results of pigments made by substituting for the titania, equal weights of alumina and silica. In other words, the $TiO_2$ curve resulted from a batch made up of 95 parts by weight $ZrO_2$, 15 parts by weight ammonium metavanadate and 10 parts by weight $TiO_2$. The $Al_2O_3$ curve resulted from a batch made up of 95 parts by weight $ZrO_2$, 15 parts by weight ammonium metavanadate and 10 parts by weight $Al_2O_3$ and the $SiO_2$ curve resulted from a batch made up of 95 parts by weight $ZrO_2$, 15 parts by weight ammonium metavanadate and 10 parts by weight $SiO_2$. In these instances the $ZrO_2$ contained approximately 1% $Na_2O$ and approximately 5% $SiO_2$ in the form of zirconium silicate. (That is, the "$ZrO_2$" was only about 84% $ZrO_2$, 1% $Na_2O$ and 15% $ZrSiO_4$.) The full line represents a strong yellow color slightly browner than lemon yellow. The $Al_2O_3$ line represents a weaker yellow color while the $SiO_2$ line represents a greenish color. We do not fully understand the reason for this different behavior of these materials, but numerous trials have been made and these results have been found to be characteristic.

A number of runs were made for the purpose of determining the effect of varying the proportions of vanadium and titanium in pigments according to the invention. In Fig. 3 there are shown 4 color curves representing the effect of varying the vanadium content. The full line indicated by the numeral 11.7 indicates the color in glaze on tile resulting from a batch containing 95 parts by weight $ZrO_2$ of the same kind used in connection with the compositions of Fig. 1, 15 parts by weight of ammonium metavanadate and 10 parts by weight of $TiO_2$. Leaving the other factors constant, the amount of ammonium metavanadate was varied both above and below that represented by the full line. It will be understood that 11.7 is the calculated amount of $V_2O_5$ resulting from 15 parts by weight of ammonium metavanadate. The line labeled 2.3, resulted from a pigment leaving the other factors the same but containing only 3 parts ammonium metavanadate, enough to yield 2.3 parts of $V_2O_5$. This color can be seen to be pale as compared with the optimum. The 4.6 line resulted from a pigment which contained twice as much of the vanadium compound, and which, while not as strong as the optimum composition, was a strong light brownish yellow of good quality. Going to the other extreme and using enough ammonium metavanadate to yield 39 parts by weight of $V_2O_5$, a color was produced having the characteristics indicated by the dotted line 39. It can be seen that the use of large quantities of the vanadium compound does not result in any corresponding improvement in the pigment but that the composition indicated by the full line gives the best results. This is more evident from visual examination than from the color curves until the observer becomes familiar with both tests as applied to this type of pigment.

Figure 4:
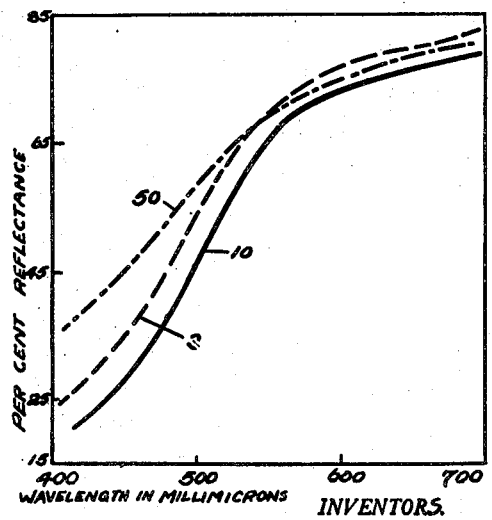

In Fig. 4, we have shown in full line, labeled 10, the color in glaze of a pigment which resulted from a batch composition identical with those indicated by the full lines in Figs. 1, 3, 4, 5, and 7. (Application of the glaze to tile, firing and other conditions vary slightly and give slightly different curves even from the same composition.) This curve resulted from a batch made up of 95 parts by weight of the same type of $ZrO_2$ used for the previous examples, 15 parts by weight of ammonium metavanadate (11.7 parts $V_2O_5$ calculated) and 10 parts of $TiO_2$. In reducing the amount of $TiO_2$ to 3 parts instead of 10, a paler yellow was produced, the color of which is indicated by the dashed line 3. Going to the other extreme and using 50 parts of $TiO_2$, a tile was produced having the color indicated by the dot and dash line 50.

Several other compositions in the series of Figs. 3 and 4 were tested but it was thought better not to confuse the drawings by an excessive number of lines; they showed intermediate color characteristics. It was found that the compositions represented by the full lines in Figs. 1, 3, 4, 5 and 7 are those which give the strongest yellows.

The addition of free silica to the composition giving the strongest yellow was found to result in a greenish coloration. Inasmuch as the composition indicated by the line $TiO_2$ in Fig. 1 was found to give a strong yellow free from the greenish effect, the conclusion was reached that the technical $ZrO_2$ which the analyst reported to contain about 5% of silica either did not contain any such quantity of free silica or else the $TiO_2$ content was capable of suppressing the tendency toward the green coloration. Both factors were found to contribute to the result. That is, when free silica was present, the presence of titania was effective to reduce the tendency toward greenish coloration, and it was found that the $SiO_2$ reported by the analyst in the technical $ZrO_2$ did not behave in the same fashion as free silica but behaved like zirconium silicate. On the assumption that the silica reported by the analyst was in the form of zirconium silicate, and because no analytical methods were available to distinguish between silica in the free state and silica combined in zirconium silicate, the composition represented by the line $TiO_2$ in Fig. 1 was synthesized roughly on two assumptions, one that it was free silica and the other that it was combined in zirconium silicate. By reference to Fig. 6 and samples 15 and 16 in the table below the results will be seen. The line Z in Fig. 6 indicates the color resulting from the composition of sample 16, while the curve S resulted from the composition of sample 15. It will be seen that the calculated pigment composition is the same in each case but that a relatively pure $ZrO_2$ was used and the 5% silica content was supplied in the one case as free silica and in the other case as zirconium silicate, the $ZrO_2$ content being reduced by the amount of $ZrO_2$ added as zirconium silicate. The result of this comparison is striking, the greenish coloration being very marked in the case of the composition containing free silica and a good yellow resulting from the other composition, although not as good as the composition corresponding to the line $TiO_2$ of Fig. 1. This may be accounted for partly by the fact that the supposedly pure $ZrO_2$ was not entirely free from silica but contained 0.8% $SiO_2$ on the analytical basis and .2% of lime. It is, however, sufficiently close to indicate that the amount of free silica in the $ZrO_2$ is small if there is any at all.

An extension of this test is shown in Fig. 5 where three pairs of compositions were compared, each differing from the other member of the pair by the fact that $TiO_2$ was included or not. In Fig. 5 the thin, full line 0 contained no titania, whereas the heavy full line 0-T was the same except that it contained ten parts of $TiO_2$. The line 0-T represents the same composition as that indicated by the line $TiO_2$ of Fig. 1 and may be referred to as the best composition. It will be seen that by omitting the titania the reflectance was increased in the blue end of the spectrum and decreased in the red. This weakens the reddish factor while increasing the bluishness. This, in the case of a yellow pigment gives the effect of moving toward the green. Also, it approaches closer toward what would be gray and gives the effect of a paler yellow. In the case of these two compositions, the appeal to the eye is more of a paler yellow than of a greenishness. In other words, these two are close enough that the untrained eye does not detect a color recognizable as green but sees a somewhat paler yellow.

Changing these two compositions by the addition of five parts of $SiO_2$, as seen in the table below, we produced compositions yielding colors as indicated on Fig. 5 by the color curves labeled 5 and 5-T. Here it will be seen that the silica has in each case contributed to an increase in the blue end of the spectrum and a fairly sharp decrease in the red. Similar curves adding 15 parts of $SiO_2$ produced colors corresponding to the curves 15 and 15-T. Here the hook in the red end of the spectrum is very pronounced and the blueness is further increased. The tiles from which the color curves 15 and 15-T were taken are distinctly greenish and may be characterized as brownish green. The greeniness in the case of curves 5 and 5-T is distinctly perceptible. By comparing the members of each pair of curves in Fig. 5, it will be seen that the tendency toward greenishness is markedly reduced by the presence of $TiO_2$. Thus, absence of free silica and presence of titania are both important in the production of a good strong yellow of the character indicated.

The series of curves shown in Fig. 7 was made for the purpose of determining how much free silica can be tolerated in $ZrO_2$-$V_2O_5$-$TiO_2$ compositions according to the invention. The sample labeled 0 in Fig. 7 contains no added $SiO_2$ and corresponds to the composition labeled $TiO_2$ in Fig. 1. Adding two parts of $SiO_2$, which figures 1.7% $SiO_2$ in the pigment derived from free $SiO_2$, a tile was produced having the color indicated by the dotted line labeled 2. It will be seen that the line 2 varies from the line 0 in that it is somewhat deficient in the red. This is a less red and, therefore, less rich yellow than the curve shown by the full line, but it may yet be characterized as a good yellow color. Increasing the $SiO_2$ content to three parts, which calculates to 2.5% $SiO_2$ in the pigment derived from free $SiO_2$, there was produced a tile yielding a color represented by the color curve labeled 3 in Fig. 7. This exhibits about the same deficiency in the red end of the spectrum as the composition corresponding to the line 2 but shows substantially increased reflectance in the blue end of the spectrum. This composition is not characterized by the same excellence as the preceding one but might still be called fair and might be preferred for some uses. Going on to the color curves representing compositions to which increasingly larger quantities of silica were added, these are found in Fig. 7, each labeled with the number of parts of $SiO_2$ added to the best composition. The compositions containing 0 and 1.7% $SiO_2$ derived from free $SiO_2$ might be termed excellent although the one containing no added free $SiO_2$ is distinctly the better of the two. The compositions containing 2.5 and 4.1% silica in the pigment derived from free $SiO_2$ might be said to be fair while those containing larger quantities have become distinctly greenish. From the color lines in Fig. 7, it can be seen quantitatively how each increase in added silica progressively reduces the strong yellow color characteristic.

Assuming that the use of pure $ZrO_2$ is not practicable from cost considerations and particularly that soda must be tolerated in order to make possible the use of technical $ZrO_2$ which can be had at a favorable cost, it has been found important to select materials containing little or no free silica. It has been found that unreactive $SiO_2$ combined in zirconium silicate can be tolerated and that, while distinguishing between free silica and silica in the form of zirconium silicate is difficult if not impracticable by ordinary analytical methods, the reactive silica content of $ZrO_2$ raw materials can be tested by the determination of the color characteristics through the medium of the recording spectrophotometer as applied to test tiles. For good results, raw materials containing free silica should be excluded if possible and those resulting in more than 2% of silica in the pigment composition derived from free silica in the batch should be rejected. Soda can by tolerated up to 2% on the basis of the final pigment weight and, having in mind cost considerations, apparently must be tolerated to a substantial extent. It is, of course, an important feature of this invention to make possible the toleration of soda to the extent that relatively cheap technical raw materials can be used and still produce a pigment capable of yielding a strong rich yellow coloration for ceramic uses. The fact that the pigment itself approaches a chocolate brown color is not of great importance so long as the color in tile possesses the desired characteristics.

It has been found that these brown pigments (which impart desirable yellow colors when fired), and which it will be noted are in composition somewhat similar to those described in U. S. Patent 2,441,447, may be mixed in all proportions with the blue pigments described in that patent to give a whole series of very effective colors ranging from the yellow of this invention through green to the blue of the compositions of that patent. This provides a very excellent range of yellow-green-blue pigments which are brilliant throughout the entire range.

We are not certain of the state of combination, chemical or physical, of the constituent oxides in the final pigment. Accordingly, the pigments will be defined in the claims as containing certain constituent oxides without thereby intending to signify anything concerning the state of association of such oxides in the product.

These colors are especially suitable for glaze and body stains and are also suitable for use in engobes, underglaze and overglaze stains and glass enamel colors. They give quite pleasing results in porcelain enamels but the percentage of pigment required in the case of porcelain enamels would increase the cost and tend to discourage their use in the low priced field. The invention is applicable to glaze and body compositions quite generally, suitable glaze compositions being low melting glasses essentially alkali aluminum silicates with or without lead, for example, 43.3 parts feldspar, 18.5 parts whiting, 25.3 parts flint, 10.3 parts Florida clay and 2.1 parts borax, by weight. Ceramic bodies are less glassy but otherwise similar, for example, clay 50%, feldspar 25% and flint 25%, by weight.

In the claims, the expression "essentially consisting of oxides of zirconium, vanadium and titanium," and the like expressions denote an analysis in terms of oxides of the elements, indicating a composition wherein such oxides are the components; but such expressions do not signify that in such compositions such oxides are present in the free state, nor do they signify anything concerning the state of association of such oxides in the compositions defined. The expression "compounds capable of yielding" followed by a list of compounds, is intended to include compounds which when fired under the conditions claimed without the other components of the batch, would yield the indicated compound; e. g., $NH_4VO_3$ would yield $V_2O_5$, and $V_2O_5$ would yield $V_2O_5$.

In the following table we have shown a considerable number of examples of batch compositions according to the invention, together with the calculated final composition of the calcined pigment, it being understood that in all these batch compositions, except where pure zirconium oxide is specified, the $ZrO_2$ probably contained about 1% of soda ($Na_2O$) and 5% of silica tied up as zircon although these values are only approximate and some variability is to be expected as in any technical material. The $ZrO_2$ denoted as "pure" in the table was only relatively so, containing a trace of soda and about 0.8 per cent $SiO_2$ on the analytical basis, likewise subject to some variation.

BATCH COMPOSITION (PARTS BY WEIGHT)

| No. | 1 | 2 | 3 | 4 | 5 | 6 | 7 | 8 | 9 | 10 | 11 | 12 |
|---|---|---|---|---|---|---|---|---|---|---|---|---|
| $ZrO_2$* | 95 | 95 | 95 | 95 | 95 | 95 | 95 | 95 | 95 | 95 | 95 | 95 |
| $NH_4VO_3$ | 15 | 15 | 15 | 3 | 6 | 15 | 25 | 50 | 15 | 15 | 15 | 15 |
| $TiO_2$ | 10 | | | 10 | 10 | 10 | 10 | 10 | 3 | 10 | 25 | 50 |
| $Al_2O_3$ | | 10 | | | | | | | | | | |
| $SiO_2$ (free) | | | 10 | | | | | | | | | |
| $ZrO_2$ (pure) | | | | | | | | | | | | |
| $Na_2CO_3$ | | | | | | | | | | | | |
| $ZrSiO_4$ | | | | | | | | | | | | |

CALCULATED PIGMENT COMPOSITION (PERCENT BY WEIGHT)

| | 1 | 2 | 3 | 4 | 5 | 6 | 7 | 8 | 9 | 10 | 11 | 12 |
|---|---|---|---|---|---|---|---|---|---|---|---|---|
| $ZrO_2$ | 76.4 | 76.4 | 76.4 | 82.7 | 81.3 | 76.4 | 71.8 | 62.0 | 81.3 | 76.4 | 67.7 | 57.3 |
| $V_2O_5$ | 10.3 | 10.3 | 10.3 | 2.7 | 4.4 | 10.3 | 15.6 | 27.0 | 10.7 | 10.3 | 8.9 | 7.4 |
| $TiO_2$ | 8.5 | | 8.5 | 9.3 | 9.1 | 8.5 | 8.0 | 7.0 | 2.8 | 8.5 | 19.1 | 31.0 |
| $Al_2O_3$ | | 8.5 | | | | | | | | | | |
| $SiO_2$ | 4.0 | 4.0 | 12.5 | 4.4 | 4.3 | 4.0 | 3.8 | 3.3 | 4.3 | 4.0 | 3.6 | 3.1 |
| $Na_2O$ | 0.8 | 0.8 | 0.8 | 0.9 | 0.9 | 0.8 | 0.8 | 0.7 | 0.9 | 0.8 | 0.7 | 0.6 |
| See in drawings | Fig. 1 | Fig. 1 | Fig. 1 | Fig. 3 | Fig. 3 | Fig. 3 | | Fig. 3 | Fig. 4 | Fig. 4 | Fig. 4 | Fig. 4 |
| Color in glaze on tile | SY | WY | BG | WY | E | SY | SY | E | WY | SY | WY | WY |
| Labeled on drawings | $TiO_2$ | $Al_2O_3$ | $SiO_2$ | 2.3 | 4.6 | 11.7 | | 39 | 3 | 10 | | 50 |

BATCH COMPOSITION (PARTS BY WEIGHT)—Continued

| No. | 13 | 14 | 15 | 16 | 17 | 18 | 19 | 20 | 21 | 22 | 23 | 24 |
|---|---|---|---|---|---|---|---|---|---|---|---|---|
| $ZrO_2$* | | | | | 95 | 95 | 95 | 95 | 95 | 95 | 95 | 95 |
| $NH_4VO_3$ | 15 | 15 | 15 | 15 | 15 | 15 | 15 | 15 | 15 | 15 | 15 | 15 |
| $TiO_2$ | | 10 | 10 | 10 | 10 | 10 | 10 | 10 | 10 | 10 | | |
| $Al_2O_3$ | | | | | | | | | | | | |
| $SiO_2$ (free) | | | 5 | | 2 | 3 | 5 | 9 | 13 | 15 | 5 | 15 |
| $ZrO_2$ (pure) | 95 | 95 | 89 | 79 | | | | | | | | |
| $Na_2CO_3$ | | | 1.7 | 1.7 | | | | | | | | |
| $ZrSiO_4$ | | | | 15 | | | | | | | | |

CALCULATED PIGMENT COMPOSITION (PERCENT BY WEIGHT)—Continued

| | 13 | 14 | 15 | 16 | 17 | 18 | 19 | 20 | 21 | 22 | 23 | 24 |
|---|---|---|---|---|---|---|---|---|---|---|---|---|
| $ZrO_2$ | 89.1 | 81.4 | 76.3 | 76.3 | 75.2 | 74.2 | 73.3 | 70.9 | 68.9 | 67.7 | 79.8 | 73.3 |
| $V_2O_5$ | 10.9 | 10.00 | 10.0 | 10.0 | 9.9 | 9.7 | 9.6 | 9.3 | 9.0 | 8.9 | 10.5 | 9.6 |
| $TiO_2$ | | 8.6 | 8.6 | 8.6 | 8.4 | 8.8 | 8.2 | 8.0 | 7.7 | 7.6 | | |
| $Al_2O_3$ | | | | | | | | | | | | |
| $SiO_2$ | | | 4.3 | 4.3 | 5.7 | 6.5 | 8.0 | 11.0 | 13.7 | 16.1 | 8.8 | 16.3 |
| $Na_2O$ | | | 0.8 | 0.8 | 0.8 | 0.8 | 0.8 | 0.8 | 0.7 | 0.7 | 0.9 | 0.8 |
| See in drawings | Fig. 5 | {Fig. 5 / Fig. 7} | Fig. 6 | Fig. 6 | Fig. 7 | Fig. 7 | {Fig. 5 / Fig. 7} | Fig. 7 | Fig. 7 | {Fig. 5 / Fig. 7} | Fig. 5 | Fig. 5 |
| Color in glaze on tile | WY | SY | BG | E | E | GY | GY | GY | BG | BG | GY | BG |
| Labeled on drawings | 0 | {0-T / 0} | S | Z | 2 | 3 | {5-T / 5} | 9 | 13 | {15-T / 15} | 5 | 15 |

Note.—SY=strong yellow; WY=weak yellow; GY=greenish yellow; E=good yellow; BG=brownish green.
*In samples which do not indicate that pure $ZrO_2$ was used in the batch, the $ZrO_2$ in the batch composition is about 1% $Na_2O$ and 5% $SiO_2$ by weight, analytical basis, little or none of the $SiO_2$ being free. The effect of this is shown in the calculated composition.
Samples 7 and 11 were made and the color curves were intermediate adjacent samples but were omitted from the drawings to avoid overcrowding the lines.
Samples 14, 19, and 22 appear in two figures of the drawings; the upper reference character shown in the bottom line of this table refers to Fig. 5 in each of these cases.

Having thus described our invention, what we claim is:

1. A brown ceramic pigment of the $ZrO_2$-$V_2O_5$ type, wherein the $ZrO_2$ contains as an impurity from 0.2 to 2.0 parts by weight of $Na_2O$ based upon the weight of $ZrO_2$ (impurities included), said pigment being capable of imparting to ceramic bodies a pleasing yellow color upon firing, such pigment being improved with respect to color by the inclusion of $TiO_2$ therein, such improvement consisting in a lowered reflectance of light of wavelength in the blue end of the spectrum and an increased reflectance of light of wavelength in the red end of the spectrum, the said pigment essentially consisting of (parts by weight):

| | | |
|---|---|---|
| $ZrO_2$ | 99.8 to 98 | 60 to 90 |
| $Na_2O$ | 0.2 to 2.0 | |
| $V_2O_5$ | | 4 to 30 |
| $TiO_2$ | | 2.5 to 35 |

2. A brown ceramic pigment of the $ZrO_2$-$V_2O_5$ type, wherein the $ZrO_2$ contains as an impurity from 0.2 to 2.0 parts by weight of $Na_2O$ based upon the weight of $ZrO_2$ (impurities included), said pigment being capable of imparting to ceramic bodies a pleasing yellow color upon firing, such pigment being improved with respect to color by the inclusion of $TiO_2$ therein, such improvement consisting in a lowered reflectance of light of wavelength in the blue end of the spectrum and an increased reflectance of light of wavelength in the red end of the spectrum, the said pigment essentially consisting of (parts by weight):

| | | |
|---|---|---|
| $ZrO_2$ | 96.8 to 93.5 | 75 to 86 |
| $SiO_2$ | 2.5 to 5 | |
| $Na_2O$ | 0.2 to 1.5 | |
| $V_2O_5$ | | 7 to 24 |
| $TiO_2$ | | 6 to 20 |

3. Process of preparing from impure zirconium oxide and compounds of vanadium and titanium ceramic pigments capable of imparting to ceramic glazes and bodies a yellow color of slightly brownish character comprising calcining between 1100° C. and 1400° C. for not less than one hour under non-reducing conditions a mixture of compounds comprising an impure $ZrO_2$ containing as an impurity combined sodium equivalent to from 0.2 to 2.0 parts by weight of $Na_2O$ based upon the total weight of said $ZrO_2$, such impure $ZrO_2$ containing not more than 21 parts by weight of zirconium silicate and not more than 5 parts by weight free $SiO_2$ also based upon the total weight of said impure $ZrO_2$, said mixture being capable of yielding a pigment of the following composition (parts by weight):

| | | |
|---|---|---|
| $ZrO_2$ | 99.8 to 77 | 60 to 90 |
| $ZrSiO_4$ | up to 21 | |
| $Na_2O$ | 0.2 to 2.0 | |
| $SiO_2$ | up to 5.0 | |
| $V_2O_5$ | | 4 to 30 |
| $TiO_2$ | | 2.5 to 35 |

4. Process of preparing from impure zirconium oxide and compounds of vanadium and titanium ceramic pigments capable of imparting to ceramic glazes and bodies a yellow color of slightly brownish character comprising calcining between 1100° C. and 1400° C. for not less than one hour under non-reducing conditions a mixture of compounds comprising an impure $ZrO_2$ containing as an impurity combined sodium equivalent to from 0.75 to 1.5 parts by weight of $Na_2O$ based upon the total weight of said $ZrO_2$, such impure $ZrO_2$ containing from 10 to 15 parts by weight of zirconium silicate and from 1 to 2 parts by weight free $SiO_2$ also based upon the total weight of said impure $ZrO_2$, said mixture being capable of yielding a pigment of the following composition (parts by weight):

| | | |
|---|---|---|
| $ZrO_2$ | 90 to 85 | 75 to 86 |
| $ZrSiO_4$ | 10 to 15 | |
| $Na_2O$ | 0.75 to 1.5 | |
| $SiO_2$ | 1 to 2 | |
| $V_2O_5$ | | 7 to 24 |
| $TiO_2$ | | 6 to 20 |

BURNHAM W. KING, Jr.
ADOLPH O. TESAR.

REFERENCES CITED

The following references are of record in the file of this patent:

UNITED STATES PATENTS

| Number | Name | Date |
|---|---|---|
| 2,213,168 | Monk et al. | Aug. 27, 1940 |
| 2,441,447 | Seabright | May 11, 1948 |

FOREIGN PATENTS

| Number | Country | Date |
|---|---|---|
| 379,572 | Great Britain | Sept. 1, 1932 |